United States Patent
Carter

(10) Patent No.: US 9,898,342 B2
(45) Date of Patent: Feb. 20, 2018

(54) TECHNIQUES FOR DYNAMIC CLOUD-BASED EDGE SERVICE COMPUTING

(75) Inventor: Stephen R Carter, Spanish Fork, UT (US)

(73) Assignee: Micro Focus Software Inc., Provo, UT (US)

(*) Notice: Subject to any disclaimer, the term of this patent is extended or adjusted under 35 U.S.C. 154(b) by 841 days.

(21) Appl. No.: 12/780,328

(22) Filed: May 14, 2010

(65) Prior Publication Data

US 2011/0282975 A1 Nov. 17, 2011

(51) Int. Cl.
*G06F 15/177* (2006.01)
*G06F 9/50* (2006.01)
*H04L 29/08* (2006.01)
*H04W 4/02* (2018.01)

(52) U.S. Cl.
CPC ........ *G06F 9/5055* (2013.01); *H04L 67/1021* (2013.01); *H04L 67/18* (2013.01); *H04W 4/02* (2013.01)

(58) Field of Classification Search
CPC . G06F 9/5055; G06F 9/5072; H04L 41/0806; H04L 29/06755; H04L 67/18; H04L 67/1021; H04W 4/02
USPC ........................................ 709/220
See application file for complete search history.

(56) References Cited

U.S. PATENT DOCUMENTS

| | | | | |
|---|---|---|---|---|
| 6,580,914 B1 * | 6/2003 | Smith | ..................... | H04W 4/02 455/436 |
| 7,478,142 B1 * | 1/2009 | Veditz | ..................... | G06F 9/445 709/218 |
| 7,756,525 B1 * | 7/2010 | Thomas | ............... | G06F 17/3087 455/414.3 |
| 2002/0152318 A1 * | 10/2002 | Menon et al. | ................ | 709/231 |
| 2006/0046768 A1 * | 3/2006 | Kirbas | ............ | H04M 1/274516 455/550.1 |
| 2006/0206586 A1 * | 9/2006 | Ling | ................. | H04L 29/12113 709/219 |
| 2006/0224736 A1 | 10/2006 | Graziado et al. | | |
| 2007/0288652 A1 * | 12/2007 | Carter et al. | .................. | 709/241 |
| 2008/0080526 A1 | 4/2008 | Gounares et al. | | |
| 2008/0091613 A1 | 4/2008 | Gates, III et al. | | |

(Continued)

FOREIGN PATENT DOCUMENTS

WO WO-2006041703 A1 4/2006

OTHER PUBLICATIONS

Broberg, James, et al., "MetaCDN: Harnessing 'Storage Clouds' for High Performance Content Delivery", Journal of Network and Computer Applications, vol. 32, (2009), 1012-1022.

(Continued)

*Primary Examiner* — Krista Zele
*Assistant Examiner* — Herman Belcher
(74) *Attorney, Agent, or Firm* — Schwegman Lundber & Woessner, P.A.

(57) ABSTRACT

Techniques for dynamic cloud-based edge service computing are provided. A principal requests a service and a policy is evaluated to select a cloud processing environment capable of supplying the service from an optimal network location as defined by the policy. The selected cloud processing environment is configured to supply the requested service and to monitor and control access of the principal to the requested service from the selected cloud processing environment.

20 Claims, 7 Drawing Sheets

(56) References Cited

U.S. PATENT DOCUMENTS

| | | | |
|---|---|---|---|
| 2008/0104393 A1 | 5/2008 | Glasser et al. | |
| 2009/0228967 A1* | 9/2009 | Gbadegesin et al. | 726/8 |
| 2009/0234968 A1* | 9/2009 | Thomas | H04L 65/4084 709/241 |
| 2009/0300635 A1 | 12/2009 | Ferris | |
| 2009/0319688 A1 | 12/2009 | Mason et al. | |
| 2010/0042720 A1 | 2/2010 | Stienhans et al. | |
| 2010/0050172 A1 | 2/2010 | Ferris | |
| 2010/0050239 A1* | 2/2010 | Carter et al. | 726/4 |
| 2010/0125626 A1* | 5/2010 | Lucas | H04L 67/1008 709/203 |
| 2010/0268463 A1* | 10/2010 | Kurtti | G01C 21/3679 701/469 |
| 2010/0319004 A1* | 12/2010 | Hudson et al. | 719/313 |
| 2010/0319051 A1* | 12/2010 | Bafna et al. | 726/1 |
| 2011/0016214 A1* | 1/2011 | Jackson | 709/226 |
| 2011/0138034 A1* | 6/2011 | Brookbanks et al. | 709/224 |
| 2011/0153824 A1* | 6/2011 | Chikando et al. | 709/226 |
| 2011/0238515 A1* | 9/2011 | Diwakar | 705/26.1 |

OTHER PUBLICATIONS

Pathan, Mukaddim, et al., "Load and Proximity Aware Request-Redirection for Dynamic Load Distribution in Peering CDNs", On the Move to Meaningful Intenet Systems: OTM 2008; Lecture Notes in Computer Science, Springer Berlin Heidelberg, Berlin, Heidelberg, XP019109555, (Nov. 9, 2009), pp. 62-81.

Pathan, Mukaddim, et al., "Maximizing Utility for Content Delivery Clouds", Web Information Systems Engineering—Wise 2009, Springer Berlin Heidelberg, Berlin, Heidelberg, XP019131006, (Oct. 5, 2009), pp. 13-28.

* cited by examiner

TECHNIQUES FOR DYNAMIC CLOUD-BASED EDGE SERVICE COMPUTING

BACKGROUND

Enterprises are finding it increasingly difficult to stay abreast with the rapidly evolving technology platforms. That is, software and hardware upgrades are commonplace for an information technology (IT) infrastructure of an enterprise and maintaining a state of the art infrastructure is costly, time consuming, and distracts from the business of an enterprise. But, there is no avoiding technology and the enterprise's business is intimately dependent on its underlying infrastructure. So, an enterprise is in a catch-22 position and is forced to maintain a costly IT infrastructure.

To remedy these concerns a new technology has been gaining acceptance in the industry. This technology is referred to as "cloud computing." The term "cloud" is used as a metaphor for how the Internet is depicted in diagrams and is used as an abstraction of the underlying infrastructure, which is being concealed with cloud computing. Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction.

With cloud computing and cloud storage, enterprises are recognizing an economy of scale in migrating portions of their data centers to various cloud providers. Infrastructure as a Service (IaaS) is currently the most common mechanism for providing cloud computing and storage. Software as a Service (SaaS) and Platform as a Service (PaaS) are focused more on providing specific services or specific platform services rather than raw infrastructure.

Just as the Internet rapidly evolved towards caching content on the edges close to content consumers, cloud computing needs to evolve to able to locate cloud services close to those consuming the services. This is a much different issue than placing content close to the consumer because handling cloud services close to the consumer requires much more coordination between multiple cloud services and cloud storage areas along with network bandwidth access and other network considerations. Further, placing content close to the consumer on the Internet involves placing specialized hardware and software at the geographic locations that would serve the net-locations. Such placement of specialized hardware and software on a per provider basis is not feasible for cloud services nor does it follow the cloud model.

What is needed are mechanisms that allow excess computing cycles to be changed into a cloud infrastructure and other cloud infrastructure locations that can best serve geographic locations. While the construction, development, and maintenance of cloud infrastructure is used in the industry, the placement of cloud services (as opposed to cloud infrastructure) close to the consuming entity is not known to the art.

SUMMARY

In various embodiments, techniques for dynamic cloud-based edge service computing are presented. More specifically, and in an embodiment, a method for cloud-service edge computing is provided. Specifically, a policy is evaluated, the policy defines how to select a particular processing environment; the particular processing environment is to provide a particular service requested by a principal. Next, validation and verification processing ensures that the particular processing environment has the particular service, which is initiated in the particular processing environment. Finally, the particular service is made available for access to the principal.

DETAILED DESCRIPTION

Figure 1:
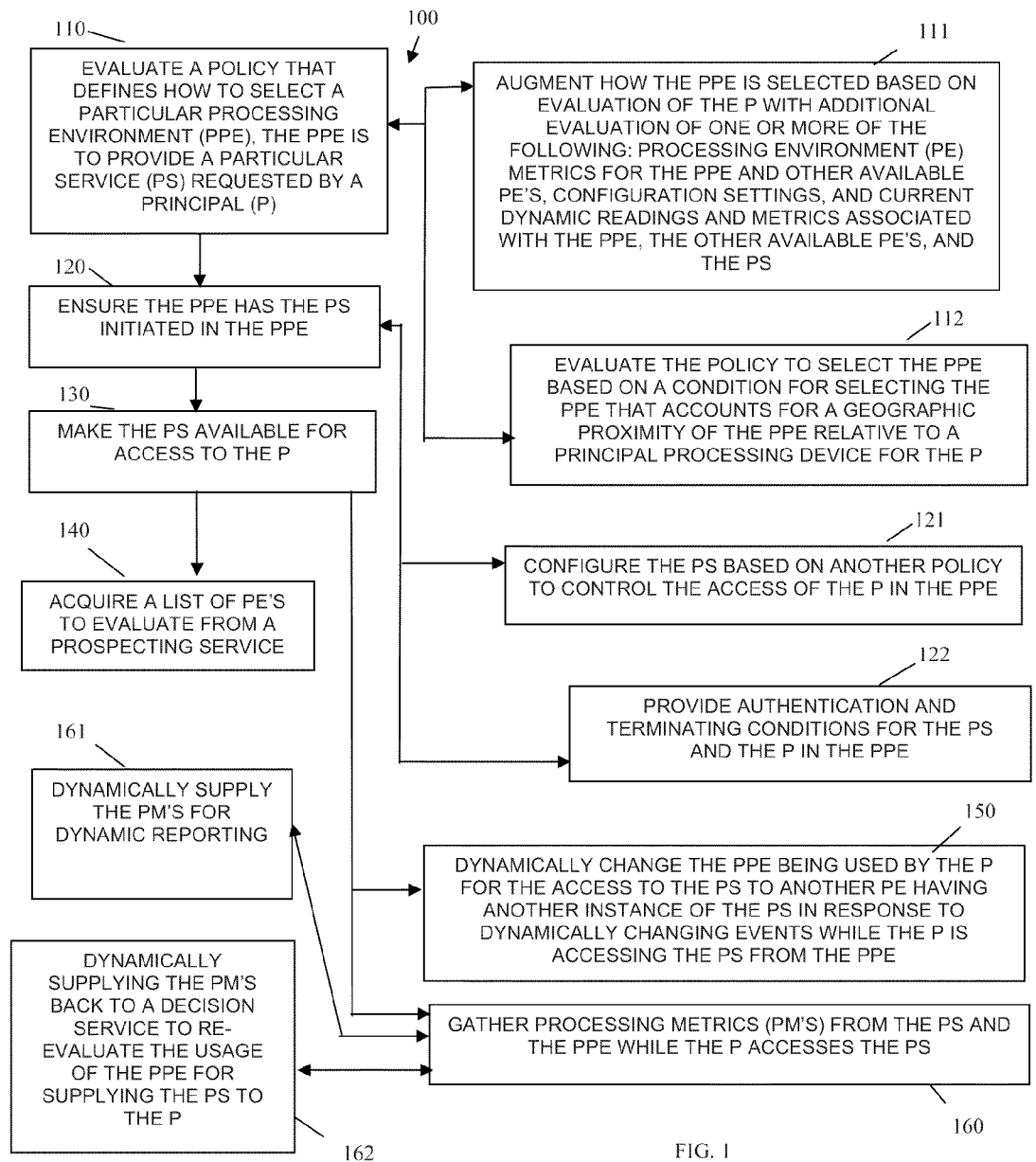
FIG. 1 is a diagram of a method for dynamic cloud-based edge service computing, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

A "data center" may be viewed as a processing environment for an enterprise. The data center can include, in some instances, multiple processing environments. The data center may contiguously reside within an internally controlled network of the enterprise or the data center may be distributed logically over internal and external network connections. In an embodiment, a data center includes just a certain type of computing resource, such as storage, and other aspects of the data center used for processing are acquired via another remote processing environment. So, the data center does not have to be self-contained, the data center can borrow or share resources with other processing environments.

A "Configuration Management Database" (CMDB) is a repository of information related to all the components of a processing environment or a set of different distributed processing environments. The CMDB includes configuration settings for the computing resources of a particular processing environment or a set of processing environments. The configuration settings include attributes and relationships for each computing resource and between the computing resources. For example, a configuration setting may state that within processing environment X, computing resource Y and Z are to communicate using Protocol P, where Y and Z define a relationship and P is an attribute of that relationship.

The CMDB also includes policies for the computing resources and processing environments. Policies include conditions and actions. For example, one policy may state a condition defined as "when resource X is accessed" perform an action defined as "log information related to the access in resource Y." Policies can be hierarchical, such that a higher-level policy trumps a lower-level policy when conflicts between policies occur.

It is noted that just because the "CMDB" includes the word database, this is not to imply that the CMDB has to be a relational database or any database for that matter. That is, the CMDB can be any repository of information where that repository can be directory based, database based, file based, table based, or a combination of some or all of these things.

Policies exist independent of the CMDB as discussed in greater detail herein and below.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-7.

FIG. 1 is a diagram of a method 100 for dynamic cloud-based edge service computing, according to an example embodiment. The method 100 (hereinafter "cloud edge service manager") is implemented in a machine-accessible and computer-readable medium and instructions that execute on one or more processors (machines, computers, processors, etc.). The machine is specifically configured to process the cloud edge service manager. Furthermore, the cloud edge service manager is operational over and processes within a network. The network may be wired, wireless, or a combination of wired and wireless.

At 110, the cloud edge service manager evaluates a policy that defines how to select a particular processing environment. The particular processing environment is used for providing a particular desired or requested service to a principal.

A variety of conditions can be presented in the policy to provide a mechanism for how to select the particular processing environment. For instance, identity-based restrictions, geographical-based restrictions, processing load-based restrictions for the particular processing environment, government or enterprise compliance-based restrictions, processing environment capabilities, licensing-based restrictions, and others. It is also noted that the particular processing environment (as noted above) is a cloud that either has or can have the requested service instantiated and executed on behalf of the principal.

In an embodiment, at 111, the cloud edge service manager augments how the particular processing environment is selected based on evaluation of the policy and based on additional evaluation of other information, such as but not limited to: processing environment metrics for the particular processing environment and other available processing environments (other clouds) available for selection, configuration settings, and/or current dynamic readings or metrics associated with the particular processing environment, the other available processing environments, and the particular requested service that the principal desires to access.

In another instance, at 112, the cloud edge service manager evaluates the policy to select the particular processing environment based on a condition for selecting the particular processing environment that accounts for a geographic proximity of the particular processing environment relative to a principal processing device for the principal.

For instance, suppose the principal is a user (in some cases the principal is also an automated service as well) that requests the service via a portable processing device, such as a phone. In this case, the user may be traveling with the phone via a car and requesting a video streaming service to access content from a first cloud. The first cloud may be located in Ohio and the user is traveling in Utah. Evaluation of the policy determines that a second cloud in Utah has or can execute the video streaming service closer (geographically) to the phone of the user from the Utah cloud.

At 120, the cloud edge service manager ensures that particular processing environment has the particular service initiated within the particular processing environment. In some cases, the particular processing environment has the particular service and has it executing so all that is needed is a check to verify this condition (although as noted below some configuration may also be needed). In other cases, the particular processing environment may have the particular service but not have it started or actively being executed; so, here the cloud edge service manager needs to ensure that the particular service is executed and configured as discussed below. In yet another situation, the particular processing environment may completely lack the particular service; here, the cloud edge service manager causes the particular service to be migrated or copied to the particular processing environment, initiated, and configured (as the case may be).

According to an embodiment, at 121, the cloud edge service manager configures the particular service (and perhaps other services within the particular processing environment) based on another policy to control access of the principal while accessing the particular service within the particular processing environment.

In another scenario, at 122, the cloud edge service manager provides authentication and terminating conditions for the particular service and the principal while operating within the particular processing environment. That is, specialized and custom authentication and termination can be defined and set by the cloud edge service manager before access to the particular service is given to the principal within the particular processing environment.

At 130, the cloud edge service manager makes the particular service available for access to the principal. This can be achieved by providing access to the principal or a principal-based service on the principal's device via a particular network connection, port, and the like along with a proper address, and/or handle.

In an embodiment, at 140, the cloud edge service manager can acquire a list of processing environments (list of clouds) to evaluate from a prospecting service. The role of the prospecting service is to identify clouds (including perhaps the selected particular processing environment) that can supply the requested particular service to the principal. The prospecting service may include its own set of policies that are evaluated in creating the list. Moreover, the list can be dynamically modified such that the prospecting service is continually and dynamically removing existing clouds from the list and adding newly found clouds to the list.

In still another case, at 150, the cloud edge service manager dynamically changes the particular processing environment being used by the principal for access to the particular service to another different processing environment (different cloud) having another duplicate instance of the particular service. This is done in response to dynamically changing events and while the principal is accessing the particular service from the original cloud (particular processing environment). The previous example is well illustrated in this embodiment of 150. For example, consider that the user (principal) is traveling in train or via an aircraft such that great geographical distances are reached by the principal in short periods of time. Here, it is advantageous to dynamically move the principal to the video streaming service (particular service) when doing so increases the principal's response time and performance with respect to the video streaming service. In another example, the original cloud may become unresponsive or even too heavily loaded such that a switch is needed.

In yet another situation, at 160, the cloud edge service manager actively and dynamically gathers processing metrics from the particular service and the particular processing environment while the principal accesses the particular service within the particular processing environment. This can be done for a variety of reasons.

For instance, at 161, the cloud edge service manager can dynamically supply the processing metrics to dynamic reporting services that can be monitored manually and/or in an automated fashion.

In another instance, at 162, the cloud edge service manager can dynamically supply the processing metrics back to a decision service (which can be the method 100 and the processing at 110) to re-evaluate the usage of the particular processing environment for supplying the particular service to the principal. In essence, a dynamic and real-time (or near real-time) feedback loop is established so that as conditions change the particular service is optimally supplied from the most beneficial cloud. Policy defines conditions that identify what is considered to be optimal and beneficial for any given scenario.

Figure 2:
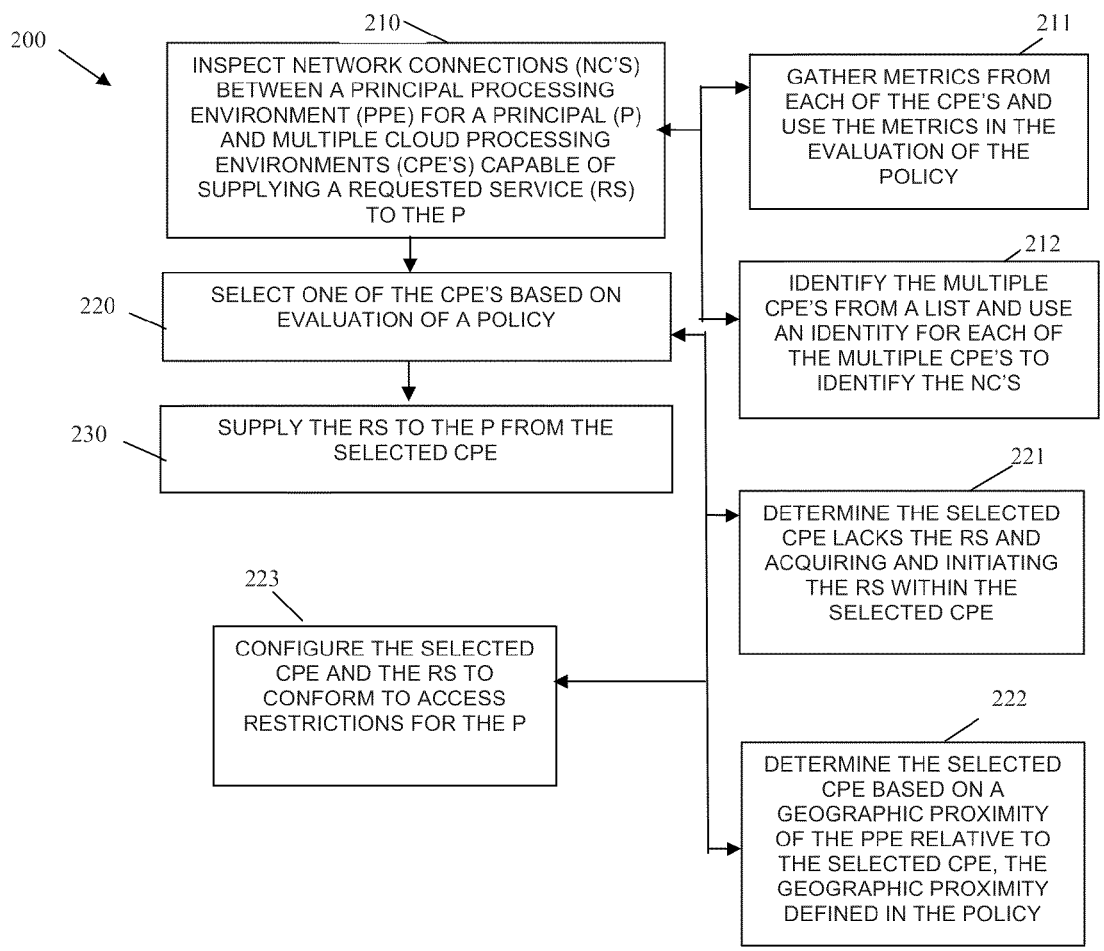
FIG. 2 is a diagram of another method for dynamic cloud-based edge service computing, according to an example embodiment.

FIG. 2 is a diagram of another method 200 for dynamic cloud-based edge service computing, according to an example embodiment. The method 200 (hereinafter "cloud manager") is implemented in a machine-accessible and computer-readable storage medium as instructions that execute on one or more processors of a network node. The cloud manager is operational over a network. The network may be wired, wireless, or a combination of wired and wireless. Furthermore, the processor is specifically configured to process the cloud manager.

At 210, the cloud manager inspects network connection between a principal processing environment (principal's processing device and its configuration and resources) for a principal and multiple cloud processing environments, which are capable of supplying a requested service to the principal. The network connections can account for network devices (routers, bridges, proxies, etc.), network bandwidth availability, security protocols, and the like.

In an embodiment, at 211, the cloud manager gathers metrics from each of the cloud processing environments and uses the metrics in the evaluation of the policy. That is, things such as processing load, memory load, resource availability, etc. can be captured and fed into the evaluation process.

In another case, at 212, the cloud manager identifies the multiple cloud processing environments from a list and then uses an identity for each of the multiple cloud processing environments to identify the network connections.

At 220, the cloud manager selects one of the cloud processing environments based on evaluation of a policy. This can be done in manners discussed above with reference to the method 100 of the FIG. 1 and in manners described below with reference to the discussion of the FIGS. 4-7.

In one case, at 221, the cloud manager determines the selected cloud processing environment lacks the requested service and in response to this determination dynamically acquires and initiates the requested service within the selected cloud processing environment.

In another case, at 221, the cloud manager determines the selected cloud processing environment based on a geographic proximity of the principal processing environment relative to the selected cloud processing environment. Here, the geographic proximity can be defined in the policy.

According to an embodiment, at 222, the cloud manager configures the selected cloud processing environment and the requested service to conform to access restrictions for the principal when the principal accesses the requested service from the selected cloud processing environment.

At 230, the cloud manager supplies the requested service to the principal from the selected cloud processing environment. In some cases, this may entail identity-based authentication and providing the proper assertions and credentials to the principal to gain access to the selected cloud processing environment and correspondingly the requested service.

Figure 3:
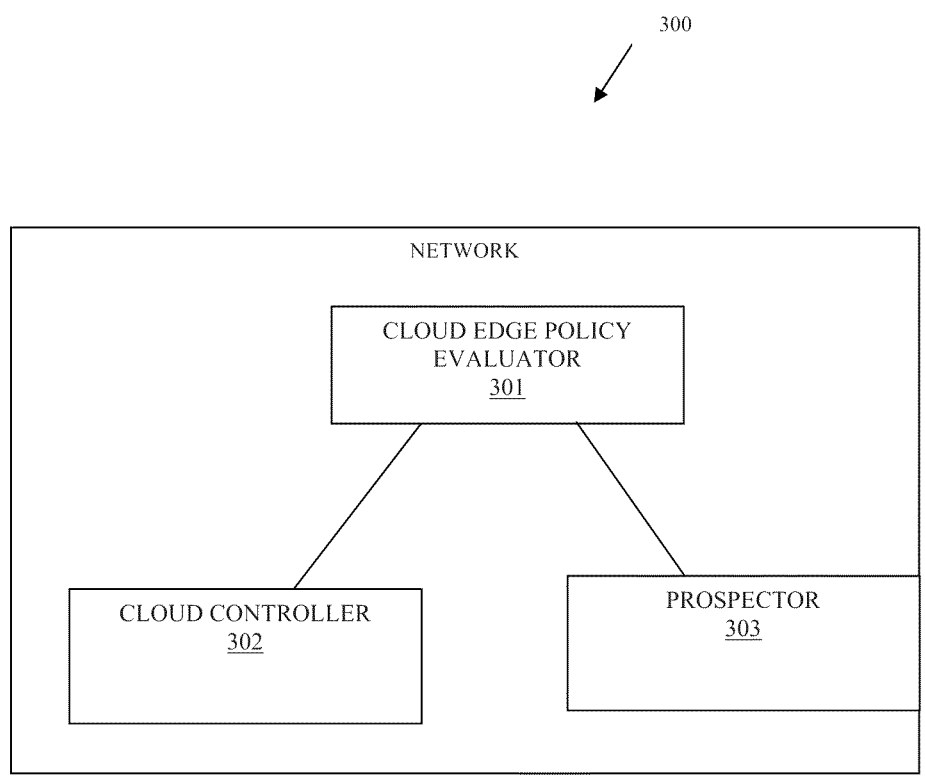
FIG. 3 is a diagram of a cloud edge service management system, according to an example embodiment.

FIG. 3 is a diagram of a cloud edge service management system 300, according to an example embodiment. The cloud edge service management system 300 is implemented in a machine-accessible and computer-readable storage medium as instructions that execute on one or more processors (multiprocessor) and that is operational over a network. The one or more processors are specifically configured to process the components of the cloud edge service management system 300. Moreover, the network may be wired, wireless, or a combination of wired and wireless. In an embodiment, the cloud edge service management system 300 implements, among other things, certain aspects of the methods 100 and 200 represented by the FIGS. 1 and 2, respectively.

The cloud edge service management system 300 includes a cloud edge policy evaluator 301 and a cloud controller 302. In some embodiments, the cloud edge service management system 300 also includes a prospector 303. Each of these and their interactions with one another will now be discussed in turn.

The cloud edge policy evaluator 301 is implemented in a non-transitory computer-readable storage medium and executes on one or more processors of a network.

The cloud edge policy evaluator 301 is configured to select a cloud processing environment for supplying a requested service of a principal (user or automated service) based on dynamic evaluation of a policy.

In an embodiment, the cloud edge policy evaluator 301 is also configured to user metrics acquired from the cloud processing environment and a geographic location of the cloud processing environment relative to another geographic location of a principal processing environment for the principal when evaluating the policy.

The cloud controller 302 is implemented in a non-transitory computer-readable storage medium and executes on one or more processors of a network.

The cloud controller 302 is configured to send configuration and control directives to the cloud processing environment for controlling access of the principal to the requested service within the cloud processing environment. This is described in greater detail below with reference to the FIG. 7.

In an embodiment, the cloud controller 302 is also configured to direct the cloud processing environment to gather processing metrics for the requested service and to report the processing metrics.

In an embodiment, the cloud edge service management system 300 includes a prospector 303.

The prospector 303 is implemented in a non-transitory computer-readable storage medium and executes on one or more processors of a network.

The prospector 303 is configured to locate the cloud processing environment and a variety of additional cloud processing environments that is used by the cloud edge policy evaluator 301 when selecting the cloud processing environment. Different aspect of the prospector 303 was described above and is further additionally described below.

Figure 4:
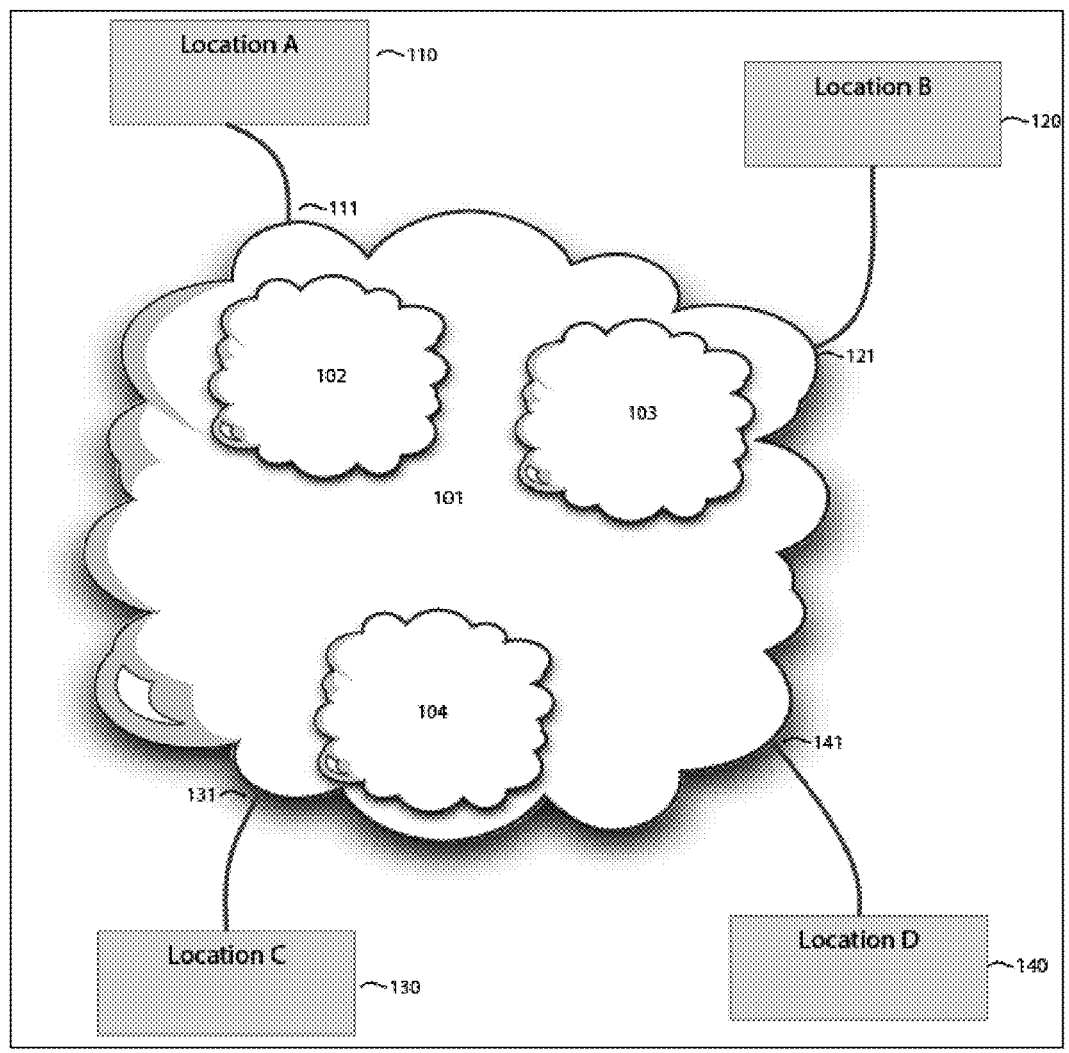
FIG. 4 is a diagram of a cloud architecture that uses the techniques presented herein.

FIG. 4 is a diagram of a cloud architecture that uses the techniques presented herein.

The FIG. 4 portrays the Internet, which is typically shown as a cloud in diagrams, as 101. Within 101 there are three additional cloud-computing infrastructure locations 102, 103, and 104. It is noted that there may be many other cloud locations, but for the sake of illustration FIG. 4 is limited to just three cloud infrastructures. In an embodiment, these cloud infrastructure locations can be a public cloud such as Amazon® or GoGrid; private clouds such as those that are created by an enterprise to utilize excess computing and storage power in the data center; or a cloud created by managed services providers, which can be utilized by some service consuming entity.

The FIG. 4 also shows several endpoint user locations labeled 110, 120, 103, and 140. In practice, there are many hundreds of thousands of such locations in the Internet. The FIG. 4 shows these 4 so that the access points shown at 111, 121, 131, and 141 can be shown to have some network association that provides for a measure of "closeness;" so that, a location can be associated with a cloud, which could host cloud services that are "closer" then other cloud locations, such relationship can be shown between 110, 111, and 102. Another relationship can be 120, 121, and 103; as well still another relationship 130, 140, 131, 141, and 104.

Figure 5:
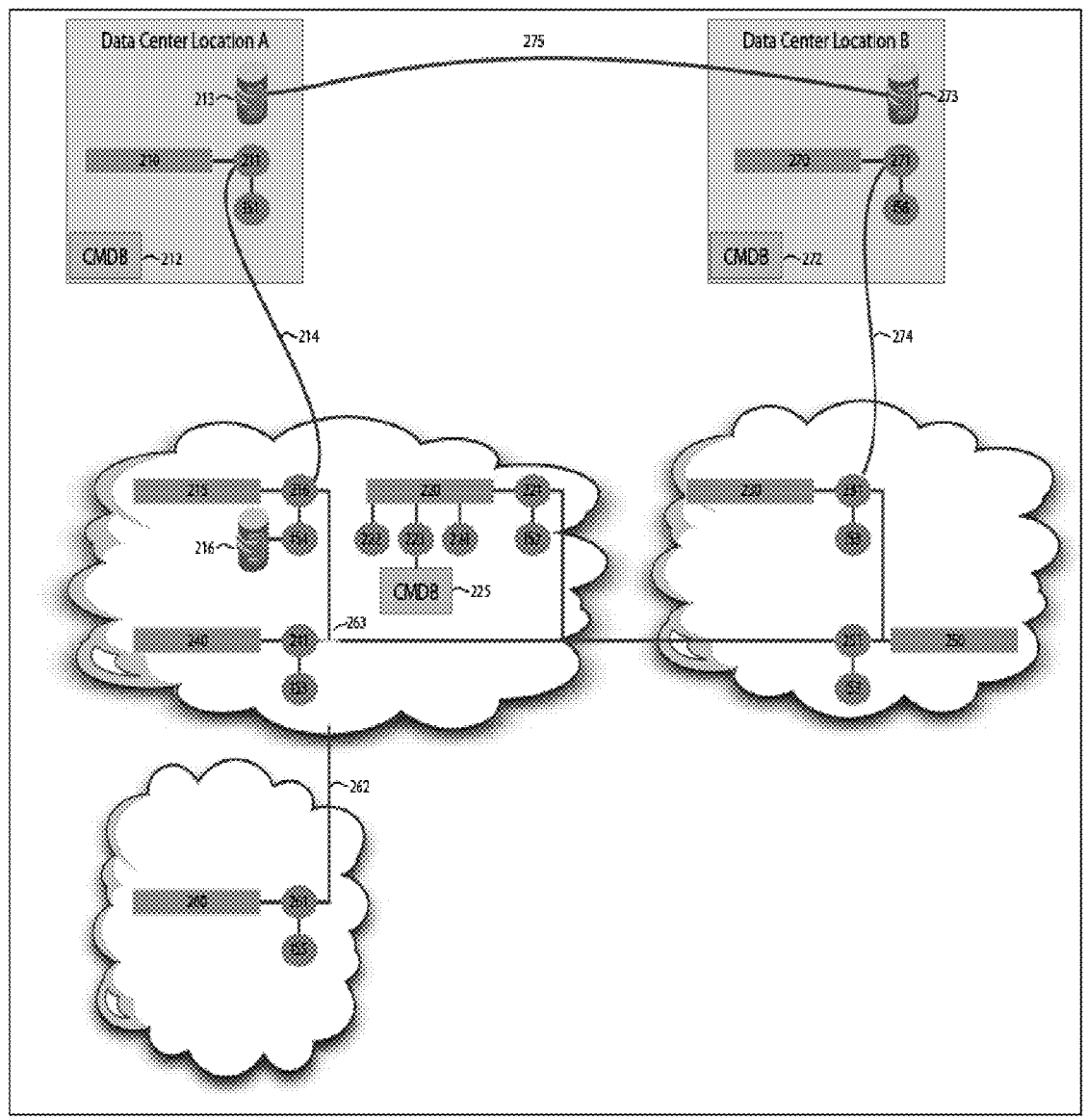
FIG. 5 is a diagram depicting an enterprise's utilization of the techniques presented herein.

For whatever reason of network connectivity the aforementioned groupings of connections and usage points can be considered closer than the utilization of other cloud locations. In an embodiment, disassociation can be changed dynamically as measurements to the usage point (see the note earlier) access data from a cloud location change. This can make 102 more preferable to 120 than 103. As a result, and according to policy, the cloud services being used by 120 and 103 can be migrated to 102. It's well to note that the policy makes the decision to make the move and that policy should take into account the length of time that suboptimal access 103 has been shown and a more optimal access to 102 has also been shown FIG. 5 is a diagram depicting an enterprise's utilization of the techniques presented herein.

In an embodiment, an enterprise may have a data center located geographically in two locations labeled Data Center Location A and Data Center Location B. In an embodiment, the enterprise may have identity stores and identity services located in the data center as is shown at 213 in 273. In an embodiment, only one identity system (such as 213) is needed by the data center, likewise in an embodiment the identity service may itself be placed in the cloud. In another embodiment multiple identity services may be utilized by the data center in which case a trust relationship at 275 is provided so that the identities crafted by each of the various identity services can be trusted by other locations.

In an embodiment, the data center may also have a CMDB (Configuration Management Database) to provide control over the configuration of the data center. In an embodiment multiple CMDB's, such as at 212 and 272, may be provided by the data center. In yet another embodiment, the CMDB can be placed in the cloud of the cloud service, such as is shown at 225; and in yet another embodiment, the identity store (also referred to herein as "identity service) may be in the cloud, such as is shown at 260.

In an embodiment, the CMDB process is shown at 223 controlling access to, modification of, and administration of the CMDB at 225. The two data center locations are shown connecting to 216 and 231 because of the "network closeness" of the cloud shown being connected at 214 and 274. The mechanism of the invention provides for the association of a process such as 222, 223, and 224 and like process associations at 230 and 260 based upon the closeness of those cloud assets. Thus, if the CMDB process at 223 in the storage at 225 is shown to be more advantageously run on the portion of the cloud, which is controlled by 230, then the techniques move such a process and storage from one cloud to the other, utilizing a pipes addressing scheme and trust scheme, other processes are able to continue to access process 223 and associated storage at 225 without interruption.

In an embodiment, a process running and connected at 210 may be moved to a cloud and connected at 215 because of the advantageous cost of the cloud provider and the network connectivity at 214. Likewise, in an embodiment, that same process may be moved to 230 because of the advantages of locating a process and the speed of access as determined by policy in the CMDB.

In an embodiment, the prospector finds new locations that are shown to have the attributes necessary for the enterprise to consider the cloud location for utilization, the cloud can be added to the list of clouds accessible by the techniques presented herein so that other processes may be migrated to those new cloud infrastructure's space; again, this is based on policy and the "closeness" of the new cloud assets to a particular entity.

In an embodiment individual users, which are accessing cloud services from a mobile device, laptop, home workstation, etc. are connected to the service running closest to the consuming entity. In an embodiment, if a cloud location is known to not have a service that is needed running, but could be advantageously run such a service and meet other policy constraints (such as number of users that could benefit from the instantiation of a new service) then a new process may be started in the new cloud location such as is shown at 260.

Figure 6:
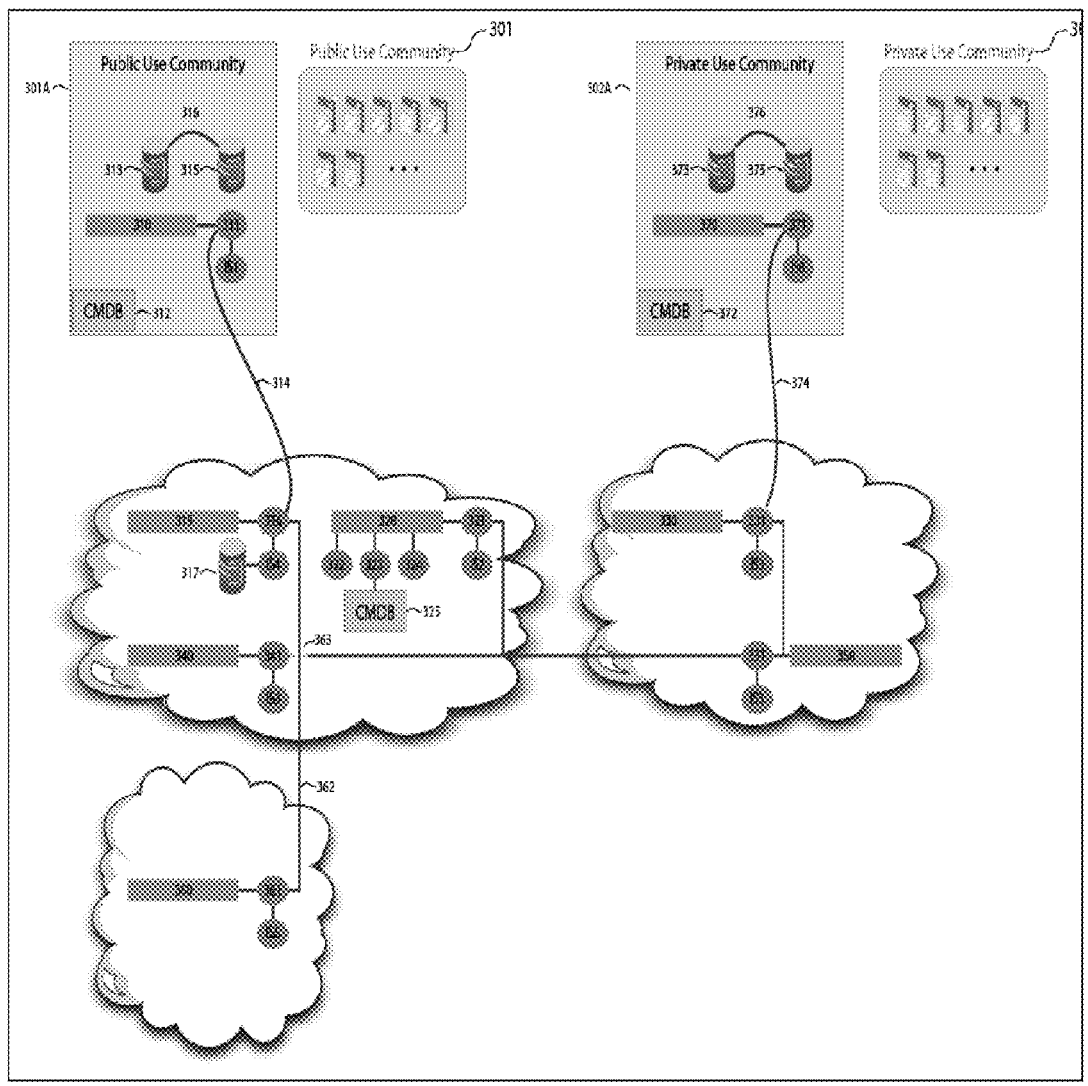
FIG. 6 is a diagram depicting private and/or public utilization of the techniques presented herein.

FIG. 6 is a diagram depicting private and/or public utilization of the techniques presented herein.

A public use community may not need extensive identity control but in an embodiment identity services at 313 and 315 are shown with a trust relationship at 316. In an embodiment, a trust relationship is not needed and only a single identity store is needed at 313. The public use community at 301 shows many communities within the public use community, in an embodiment each community has its own identity store and conductivity into cloud infrastructure such as at 310, 311, etc. In an embodiment, each public use community instance may also require their own CMDB at 312. In other embodiments, none of those are needed because the public use community is ad hoc and does not require the organizational considerations of an identity store and the CMDB; and yet in another embodiment, all of the public use community entities within 301, which share the same identity store and conductivity to the cloud (e.g., 310, 311, etc.) as well as share a common CMDB at 312.

Private use communities may more organization because, in order to keep the community private, identity and policy and configuration along with compliance and security are very important. In this case, identity services, such as 373 and 375 along with trust relationship at 376 are probably be required. In an embodiment, each entity within the private use community has their own 302A infrastructure. In another embodiment, all of the entities within the private use community share the 302A infrastructure; and yet another embodiment, entities within the private use community mix-and-match between sharing 302A and having their own 302A. In any of these cases, the identity, policy, compliance, security attributes of the pipes provide the necessary separation to keep the utilization of cloud services private and constrained to only those who are a member of the private use community.

As with the enterprise discussion of the FIG. 5, embodiments of the FIG. 6 allow for the CMDB, at 325, and identity store, at 317, to be in the cloud as well. As members of a private use community or public use community join the community by using cloud services, according to policy, cloud services are instantiated at locations closer to the consuming entity.

Figure 7:
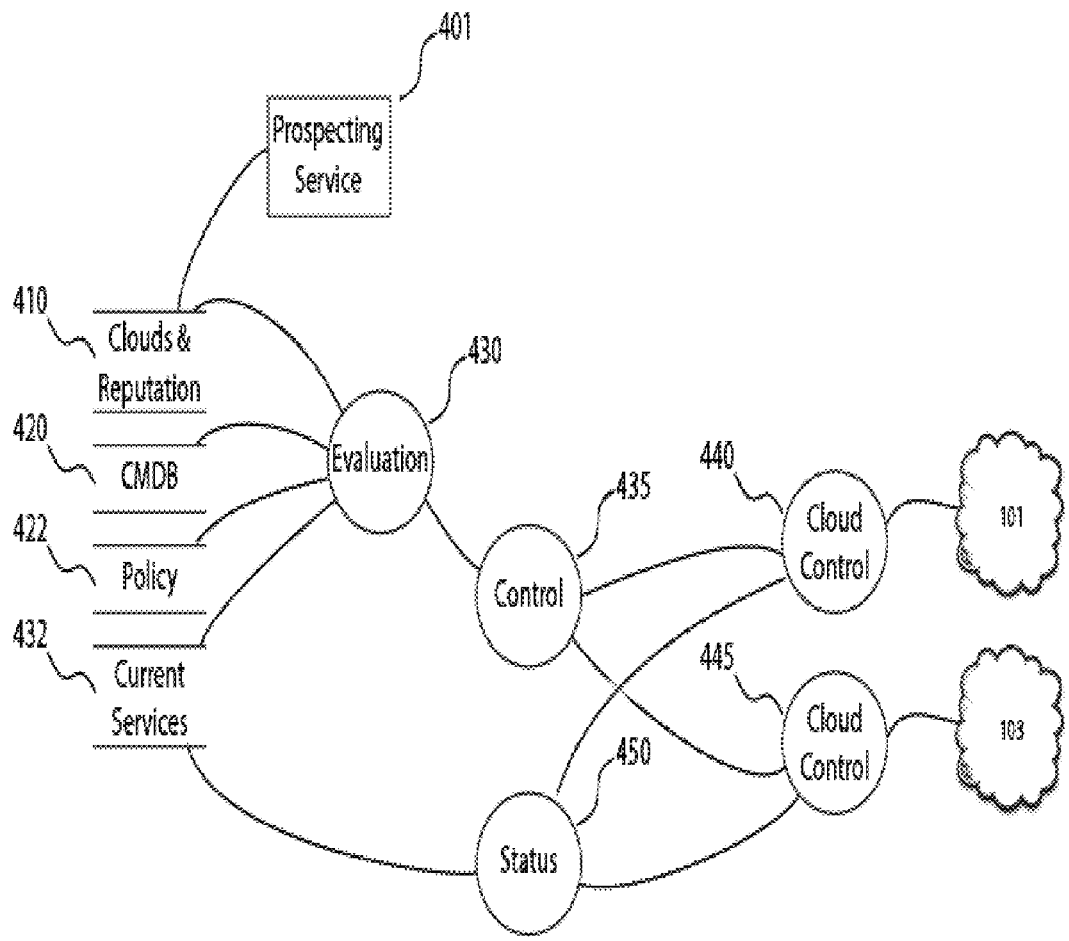
FIG. 7 is a diagram for instantiating and configuring the techniques presented herein.

FIG. 7 is a diagram for instantiating and configuring the techniques presented herein.

At 401 a prospecting service, is providing 410, clouds and reputation information. The evaluation mechanism, at 430, is consuming the information at 410, 420, 422, and 432. The information 410 provides the necessary information to know where the clouds are, how to access those clouds, what the current billing and usage restrictions are, and what the past reputation of the utilization of that particular cloud is. The information in 420 is the CMDB providing configuration information necessary for the evaluation process at 430 to make the appropriate decisions.

Note that in some embodiments, the policy, at 422, is contained within the CMDB at 420. The information in 422 is policy information, which the evaluation mechanism of 430 uses to make sure that all decisions made for migrating, cloning, instantiating, terminating, etc. cloud services at cloud edges is done according to the dictates of the governance, risk, and compliance decisions with the specific entity using the techniques presented herein. The information 432 contains all the pertinent facts about correct services that are being run in some cloud or clouds including status, number of users utilizing the cloud service, etc.

The evaluation mechanism at 430 then determines when cloud services need to be migrated, cloned, instantiated, moved, terminated, etc. A mechanism of evaluation and control that dependent upon status is provided so that the appropriate cloud services can be made available to concerning entities in an advantageous manner. The evaluation mechanism of 430 is making those determinations based on policy to give the consuming entity the type of experience dictated by policy. In this manner, cloud services can be moved to locations that are "closer" to the consuming entity when this situation would otherwise not be capable of being realized.

The control mechanism of 435 interprets the command from evaluation of 430 and forwards the appropriate control directives to a specific process for controlling the cloud of the service that needs to be affected. For example, cloud control at 440 is specific to the cloud at 101 because the APIs (Application Programming Interfaces) and other control mechanisms specific to 101 are different than those of other clouds (e.g., 103).

Thus, the control directives from 435 are posted to both 440 and 445 so that the appropriate cloud services can be instantiated, migrated, cloned, terminated, etc. in 101 and 103.

Information from cloud control at 440 and 435 are reported to the status process at 450, which updates current services at 432 so that the evaluation mechanism of 430 can make decisions based upon the most recent state of the cloud services being managed by the techniques presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium that is executed by one or more processors of a network to perform the method, comprising:

evaluating a policy that defines how to select a particular processing environment, the particular processing environment is to provide a particular service requested by a principal that is operating a portable processing device and traveling with the portable processing device, wherein a principal processing environment of the principal is different from the particular processing environment, and wherein at least one aspect of the policy includes geographical closeness between the particular processing environment and the principal; and wherein evaluating further includes dynamically excluding from selection consideration at least one other processing environment that is geographically closer to the principal than the particular processing environment by disassociating that processing environment from consideration based on measurements of usage at that processing environment and based on a length of time that suboptimal access has been present the at least one other processing environment and a length of time that more optimal access has been present at the particular processing environment, and wherein evaluating further includes determining the particular processing environment based on a number of other principals whom are users that could benefit from having the particular service delivered from the particular processing environment;

ensuring the particular processing environment can instantiate the particular service initiated in the particular processing environment and acquiring, configuring, and executing the particular service within the particular processing environment; and making the particular service available for access to the principal by forwarding control directives to a specific process, the specific process controlling the particular processing environment.

2. The method of claim 1, wherein evaluating further includes augmenting how the particular processing environment is selected based on evaluation of the policy with additional evaluation of one or more of the following: processing environment metrics for the particular processing environment and other available processing environments, configuration settings, and current dynamic readings and metrics associated with the particular processing environment, the other available processing environments, and the particular service.

3. The method of claim 1, wherein evaluating further includes evaluating the policy to select the particular processing environment based on a condition for selecting the particular processing environment that accounts for a geographic proximity of the particular processing environment relative to a principal processing device for the principal.

4. The method of claim 1, wherein ensuring further includes configuring the particular service based on another policy to control the access of the principal in the particular processing environment.

5. The method of claim 1, wherein ensuring further includes providing authentication and terminating conditions for the particular service and the principal in the particular processing environment.

6. The method of claim 1 further comprising, acquiring a list of processing environments to evaluate from a processing prospecting service.

7. The method of claim 1 further comprising, dynamically changing the particular processing environment being used by the principal for the access to the particular service to another processing environment having another instance of the particular service in response to dynamically changing events while the principal is accessing the particular service from the particular processing environment.

8. The method of claim 1 further comprising, gathering processing metrics from the particular service and the particular processing environment while the principal accesses the particular service.

9. The method of claim 8 further comprising, dynamically supplying the processing metrics for dynamic reporting.

10. The method of claim 8 further comprising, dynamically supplying the processing metrics back to a decision service to re-evaluate the usage of the particular processing environment for supplying the particular service to the principal.

11. A method implemented and residing within a non-transitory computer-readable storage medium that is executed by one or more processors of a network to perform the method, comprising:

inspecting network connections between a principal processing environment for a principal and multiple cloud processing environments capable of supplying a requested service to the principal, wherein the principal processing environment is different from each of the multiple cloud processing environments, wherein inspecting further includes identifying the principal processing environment as being within a portable processing device operated by the principal and traveling with the principal;

selecting one of the cloud processing environments based on evaluation of a policy, wherein at least one aspect of the policy includes geographical closeness between the principal processing environment and each of the multiple cloud processing environments; and wherein selecting further includes dynamically excluding from selection consideration at least one cloud processing environment that is geographically closer to the principal than the selected cloud processing environment by disassociating that cloud processing environment from consideration based on measurements of usage at that cloud processing environment and based on a length of time that suboptimal access has been present the at least one other processing environment and a length of time that more optimal access has been present at the selected processing environment, and wherein selecting further includes determining that the selected cloud processing environment based on a number of other principals whom are users that could benefit from having the requested service delivered from the selected cloud processing environment; and supplying the requested service to the principal from the selected cloud processing environment and providing proper assertions and credentials for the principal to gain authenticated access to the selected cloud processing environment and the requested service, wherein supplying further includes supplying the requested service by forwarding control directives to a specific process, the specific process controlling the selected cloud processing environment.

12. The method of claim 11, wherein inspecting further includes gathering metrics from each of the cloud processing environments and using the metrics in the evaluation of the policy.

13. The method of claim 11, wherein inspecting further includes identifying the multiple cloud processing environments from a list and using an identity for each of the multiple cloud processing environments to identify the network connections.

14. The method of claim 11, wherein selecting further includes determining the selected cloud processing environment lacks the requested service and acquiring and initiating the requested service within the selected cloud processing environment.

15. The method of claim 11, wherein selecting further includes determining the selected cloud processing environment based on a geographic proximity of the principal processing environment relative to the selected cloud processing environment, the geographic proximity defined in the policy.

16. The method of claim 11, wherein selecting further includes configuring the selected cloud processing environment and the requested service to conform to access restrictions for the principal.

17. A multiprocessor-implemented system, comprising:
an cloud edge policy evaluator implemented in a non-transitory computer-readable storage medium and to execute on one or more processors of a network; and
a cloud controller implemented in a non-transitory computer-readable medium and to execute on one or more processors of the network; the cloud edge policy evaluator is configured to select a cloud processing environment based at least in part on geographical closeness between the cloud processing environment and a principal processing environment of a principal that operates a portable processing device that is traveling with the principal, and wherein the cloud edge policy evaluator is configured to exclude from selection consideration at least one other cloud processing environment geographically closer to the principal than the selected cloud processing environment by disassociating that cloud processing environment from consideration based on measurements of usage at that cloud processing environment and based on a length of time that suboptimal access has been present the at least one other processing environment and a length of time that more optimal access has been present at the selected processing environment, and the cloud edge policy evaluator further configured to supply to a requested service of the principal based on evaluation of a policy, and wherein the requested service is acquired, configured, and executed within the cloud processing environment is identified based at least in part on a number of other principals whom are users that could benefit from the requested service being delivered from the cloud processing environment, the cloud controller is configured to send configuration and controlling directives to a specific process of the cloud processing environment, and wherein the specific process is configured to:
control the cloud processing environment and control access of the principal to the requested service within the cloud processing environment, and wherein the cloud processing environment is different from the principal processing environment.

18. The system of claim 17, wherein the cloud edge policy evaluator is further configured to use metrics acquired from the cloud processing environment and a geographical location of the cloud processing environment relative to another geographical location of a principal processing environment for the principal when evaluating the policy.

19. The system of claim 17, wherein the cloud controller is configured to direct the cloud processing environment to gather processing metrics for the requested service and report the processing metrics.

20. The system of claim 17 further comprising a prospector implemented in a non-transitory computer-readable storage medium to execute on one or more processors of the network, the prospector configured to locate the cloud processing environment and a variety of additional cloud processing environments that is used by the cloud edge policy evaluator when selecting the cloud processing environment.

\* \* \* \* \*